No. 620,427. Patented Feb. 28, 1899.
J. B. DAVIS.
SOLAR AND TRANSIT INSTRUMENT.
(Application filed Jan. 3, 1898.)
(No Model.) 2 Sheets—Sheet 1.
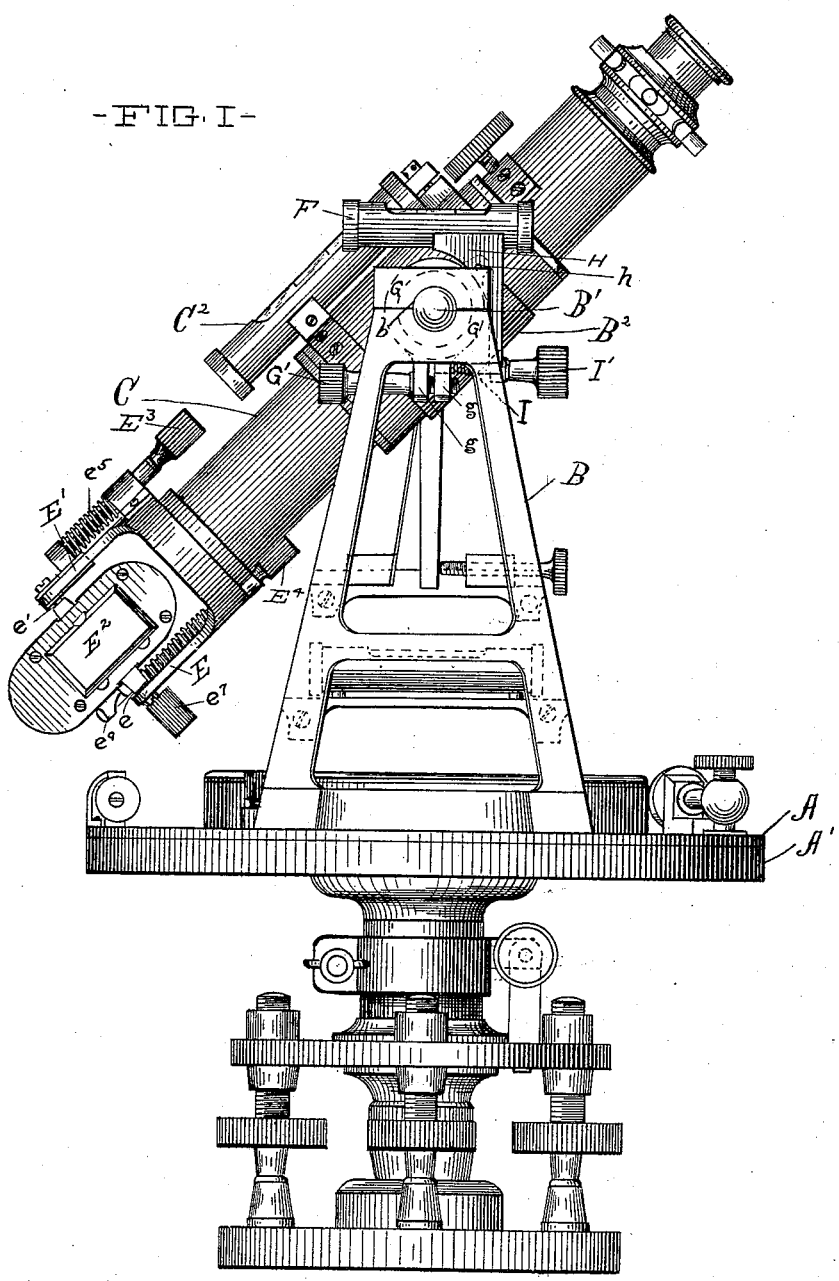
FIG. I.
WITNESSES:
INVENTOR
John B. Davis
BY
Lynch, Cover & Connelly
ATTORNEYS.

No. 620,427. Patented Feb. 28, 1899.
J. B. DAVIS.
SOLAR AND TRANSIT INSTRUMENT.
(Application filed Jan. 3, 1898.)
(No Model.) 2 Sheets—Sheet 2.
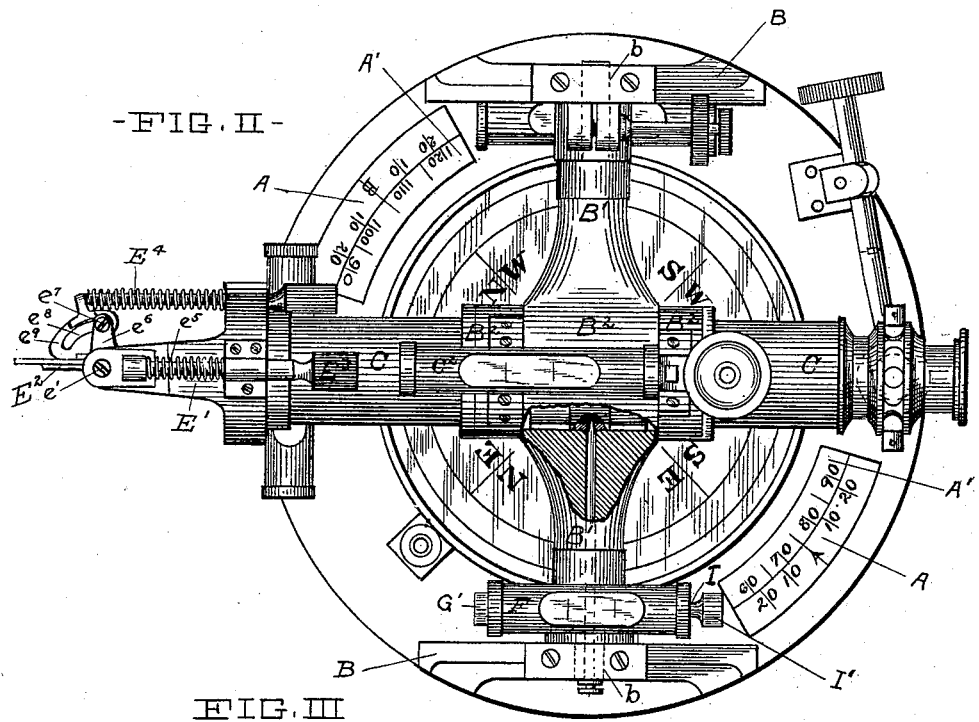
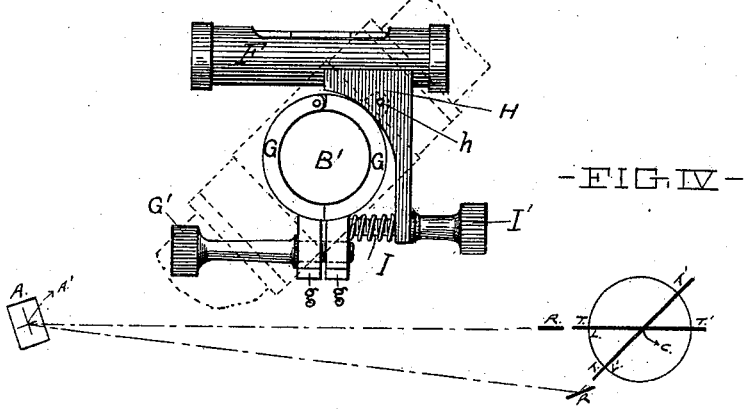
WITNESSES:
INVENTOR
John B. Davis
BY
Lynch Parcx & Donnell
ATTORNEYS

UNITED STATES PATENT OFFICE.

JOHN B. DAVIS, OF CLEVELAND, OHIO.

SOLAR AND TRANSIT INSTRUMENT.

SPECIFICATION forming part of Letters Patent No. 620,427, dated February 28, 1899.

Application filed January 3, 1898. Serial No. 665,269. (No model.)

*To all whom it may concern:*

Be it known that I, JOHN B. DAVIS, of Cleveland, Cuyahoga county, Ohio, have invented certain new and useful Improvements in Solar and Transit Instruments; and I do hereby declare the following to be a full, clear, and exact description of the invention, such as will enable others skilled in the art to which it pertains to make and use the same.

My invention relates to that class of engineers' and surveyors' transits known as "combined solar and engineers' and surveyors' transits."

This invention is an improvement on the solar and transit instrument set forth in United States Letters Patent No. 575,215, issued to me January 12, A. D. 1897.

My present invention has for its object the elimination of the vertical arc, which has heretofore been used in dipping the telescope to conform to the latitude of the place in making solar observations.

In the drawings, Figure I represents a side elevation of a solar transit embodying my invention. Fig. II represents a plan view of the instrument. Fig. III represents a side elevation of a spirit-level and its mountings, which is designed to be adjustably secured to the transverse axis of the telescope, so as to be capable of either rapid or slow and accurate adjustment in relation to said axis and telescope. Figs. IV and V are diagrams illustrating the operation of the instrument.

Inasmuch as the present invention is an improvement on the instrument set forth in my patent numbered 575,215 I do not deem it necessary to describe in detail the construction of the transit, but would state that it should be the same as set forth in said patent, excepting that the vertical arc, its mountings, and vernier are eliminated, and I prefer to mount the spirit-level $C^2$ above the telescope instead of beneath it, as illustrated.

As far as relates to my present invention I would state that it consists, broadly, in so forming a transit that the telescope is capable of being rotated upon its optical axis or line of collimation, providing a reflector which is secured to the object end of the telescope and rotative therewith and providing the transverse axis of the telescope with a level which moves with said axis or may be moved independent from and adjusted upon the same, thus doing away entirely with the vertical arc and its connections and mountings and providing a transit in which there are no solar adjustments to be maintained and in which the usual declination arc and the latitude arc are eliminated. The graduated limb of transit serves all purposes in the measurement of angles.

I will now proceed to set forth such details of the construction as are essential to be described in this connection, and in doing so I shall as far as necessary and practical use the same reference-letters to indicate the same parts as in my Patent No. 575,215.

The usual horizontal limb of the instrument, composed of two revolving plates A and A', is provided, also the graduated circle and proper mountings, clamps, and tangent-screws used in connection with the horizontal limb are preferably arranged and constructed as illustrated and set forth in my previous patent, No. 575,215. Standards B B are also provided, extending upward from the upper plate A and provided with suitable bearings $b$ for the transverse axis B'. The axis B' is formed at its middle with a sleeve $B^2$, within which a telescope C is journaled, so as to allow the telescope to be rotated around its optical axis or the line of collimation. The mountings, clamp-screws, and devices necessary for proper manipulation of the telescope are preferably such as set forth in Patent No. 575,215, except that the vertical or latitude arc D of said patent and its mountings are entirely eliminated.

By doing away with the vertical or latitude arc of the transit I obviate certain mechanical and operative objections and provide an instrument far more simple and accurate, as will be seen.

$C^2$ represents the usual spirit-level, which I prefer to mount above the telescope, as illustrated. This spirit-level $C^2$ is mounted in any suitable manner, so as to correctly indicate when the optical axis or the line of collimation of the telescope is horizontally leveled.

A reflector is secured to the object end of the telescope in such a manner as to rotate with the telescope when the same is rotated on its axis. The mountings and adjusting devices of reflector are similar to those shown and set forth in my Patent No. 575,215, and the operation and relation of the reflector in connection with the telescope are also the same as set forth in said patent, in which, as in this case, two brackets E E' project at approximately diametrically opposite points from the object end of the telescope, being either integral with the same or, as illustrated in the drawings, extending from a collar secured upon the telescope-tube. A reflector $E^2$ has trunnions $e$ and $e'$ projecting at opposite points. An adjusting-screw $E^3$ is journaled parallel with said brackets and has its end threaded in a lug projecting from a bearing-block. A spring $e^5$ surrounds the screw and bears against said lug and the bearing for the screw, so as to compensate for any loose play of the screw. An ear $e^6$ projects from the back of the reflector and has a clamp-screw $e^7$, which passes through, has play in, and may clamp a segmental slot $e^8$ in a segment-arm $e^9$, fulcrumed upon one reflector-trunnion. The edge of said segment-arm has a lug which is engaged by the end of a tangent-screw $E^4$. The reflector may therefore be tilted with its plane at any angle to the axial line or line of collimation of the telescope, whereupon the ear upon the reflector and the segment-arm may be clamped together, and final accurate adjustment may be made by means of the tangent-screw.

F represents an auxiliary or latitude level which is mounted on or in relation with the transverse axis B', so as to either move with said axis and the telescope or be adjusted in relation to either.

I have shown in the drawings (see Fig. III) one method of mounting the level F in relation to the axis B', which consists in providing a clamp-ring or split collar G of such size as to fit and clasp the axis B'. A clamping thumb-screw G' is provided, which engages with two lips $g\ g$ and governs or controls the adjustment of the said ring G, and it is by loosening or tightening the screw G' that the said ring and the level can be adjusted in relation to the axis and telescope or may be secured in predetermined relation to said parts and be made to move with them.

F represents the auxiliary or latitude spirit-level, which is rigidly mounted on a bracket H, secured, by means of a pivot $h$, to a lug formed on the periphery of the ring G. The lower arm of the bracket H is provided with an adjusting-screw I for obtaining fine or close adjustments. The screw I is preferably so constructed as to engage a female screw-thread in a thumb-nut I'. However, instead of mounting the level F as above set forth other means may be employed with good results.

I will now describe the method of operating my improved instrument, and in this connection reference is made to Figs. IV and V of the drawings, in which Fig. IV illustrates the latitude angle in a horizontal plane and Fig. V illustrates the latitude angle in a vertical plane. In Fig. IV, A represents the target; A', the target-center; C, the transit-center; T T', the telescope; R, the reflector, and L L' the latitude angle. The letters A', C, and R are in a horizontal plane. In Fig. V, A represents the target; A', the target-center; T T', the telescope; $T^2$, the telescope-axis; R, the reflector; L L', the latitude angle, and B B' the telescope-axis level. The letters A', $T^2$, and R are in a vertical plane.

The operation of determining the meridian in this construction is the same as described in Letters Patent No. 575,215, issued to me, with the exception of setting off and determining the latitude of place, which are described as follows:

*To dip telescope to known latitude.*—First. With the usual transit adjustments accurately made carefully place the transit-axis vertical by means of plate-levels and telescope-level, and with horizontal limb of transit registering zero (at zero as a convenience in reading the angle) sight a target to line and level. Second. Set off on the transit limb an angle equal to the latitude of the place of observation and with the telescope still horizontal bring the image of the target-center into the line of collimation of transit. (See Fig. IV.) Return the telescope to zero-reading on limb. It will then again point to the target-center. Loosen the set-screw, which passes through an arm of telescope-axis and engages the telescope, and rotate the telescope ninety degrees, securing it in this position. Dip telescope until the target-center appears in the line of collimation, and bring the bubble of axis-level to a central position. (See Fig. V.) The telescope is now dipped to the required latitude angle, and the latitude-level enables the operator at any time to quickly and accurately determine the latitude position of telescope.

*To determine the latitude by instrument.*—First. Place reflector at proper angles (as in instructions for finding the meridian which are given in Letters Patent No. 575,215, issued to me) to reflect the sun's image when at noon declination into the optical axis of telescope. Second. Having now set the reflector in the proper relative position to the line of collimation, rotate telescope ninety degrees in its sleeve and secure it by set-screw, before referred to. Third. Dip telescope and follow sun until it has attained its greatest altitude and then set latitude or axis level in a horizontal position in order that the telescope may be returned to the proper latitude position when desired. Fourth. To read latitude angle from transit limb return the telescope to zero-reading of limb and throw the image of target-center into line of collimation. Now place telescope in a horizontal plane and move it horizontally until target-center is again seen in line of collimation, when read off the latitude from transit-circle.

It will be observed that in this construction the operation of dipping the telescope to the latitude of place becomes prior to instead of subsequent to that of placing the reflector at the proper declination position, as shown and described in Letters Patent No. 575,215, for in determining the meridian the declination position of reflector must remain undisturbed until the observation is completed, and as the reflector is used in the combination of setting telescope to latitude position the transverse axis or latitude level becomes essential to the combination as a means for reëstablishing the latitude position of telescope after reflector is set to its declination position.

What I claim is—

1. In a solar and transit instrument without a vertical or latitude arc, the combination with a telescope adapted to rotate upon its optical axis, a reflector capable of being rotated upon its axis transversely to the optical axis of the telescope, and means for adjusting the reflector-axis in relation to the telescope, of an auxiliary or latitude level secured and adjustable in relation to, the transverse axis of the telescope.

2. In a solar and transit instrument without a vertical or latitude arc, the combination with a telescope adapted to be rotated upon its optical axis or line of collimation, and to be vertically dipped upon a transverse axis; of a reflector attached to the object end of the telescope and rotating therewith; and an auxiliary or latitude level adjustably secured to the transverse axis of said telescope; substantially as and for the purpose set forth.

In testimony whereof I sign this specification, in the presence of two witnesses, this 23d day of December, 1897.

JOHN B. DAVIS.

Witnesses:
W. E. DONNELLY,
J. L. WARD HOOVER.